US012573222B2

(12) United States Patent
Tessler et al.

(10) Patent No.: US 12,573,222 B2
(45) Date of Patent: Mar. 10, 2026

(54) DETECTING RELIABILITY USING AUGMENTED REALITY

(71) Applicant: Capital One Services, LLC, McLean, VA (US)

(72) Inventors: Leeyat Bracha Tessler, Arlington, VA (US); Robert Mays, Midlothian, VA (US); Tyler Maiman, Melville, NY (US); Juwan Byrd, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 697 days.

(21) Appl. No.: 17/932,110

(22) Filed: Sep. 14, 2022

(65) Prior Publication Data

US 2024/0087346 A1 Mar. 14, 2024

(51) Int. Cl.
| | |
|---|---|
| *G06V 30/19* | (2022.01) |
| *G06V 10/56* | (2022.01) |
| *G06V 30/244* | (2022.01) |

(52) U.S. Cl.
CPC ........ *G06V 30/19093* (2022.01); *G06V 10/56* (2022.01); *G06V 30/244* (2022.01); *G06V 2201/09* (2022.01)

(58) Field of Classification Search
CPC ............. G06V 30/19093; G06V 10/56; G06V 30/244; G06V 2201/09; G06V 20/62
See application file for complete search history.

(56) References Cited

U.S. PATENT DOCUMENTS

| | | | | |
|---|---|---|---|---|
| 2005/0131718 A1* | 6/2005 | Campagna | .............. | G06T 1/005 |
| | | | | 705/401 |
| 2018/0013789 A1* | 1/2018 | Damian | .............. | H04L 63/1483 |
| 2018/0053114 A1* | 2/2018 | Adjaoute | ................. | G06N 3/02 |
| 2020/0067861 A1* | 2/2020 | Leddy | ................. | G06F 21/6245 |
| 2020/0151738 A1 | 5/2020 | Guinard et al. | | |
| 2020/0389493 A1* | 12/2020 | Vannoni | ................. | G06F 16/972 |
| 2021/0004463 A1* | 1/2021 | Todasco | ................. | G06F 21/565 |
| 2022/0139375 A1* | 5/2022 | Kwatra | ................... | G10L 25/30 |
| | | | | 704/243 |

FOREIGN PATENT DOCUMENTS

EP 2 800 061 B1 9/2017

\* cited by examiner

*Primary Examiner* — Matthew C Bella
*Assistant Examiner* — Andrew B. Jones
(74) *Attorney, Agent, or Firm* — Harrity & Harrity, LLP

(57) ABSTRACT

In some implementations, an augmented reality (AR) device may receive first images representing a webpage, an email, a product, or a store associated with a first entity. The AR device may detect, within the first images, a logo, a font, and/or a color. The AR device may apply a model, trained on a set of guidelines associated with the first entity, to the logo, the font, and/or the color. Accordingly, the AR device may receive, from the model, a first score associated with the webpage, the email, the product, or the store. The AR device may transmit an alert based on the first score. In some implementations, the AR device may further receive second images and apply the model to receive a second score associated with the webpage, the email, the product, or the store. Accordingly, the AR device may transmit an additional alert based on the second score.

20 Claims, 22 Drawing Sheets

240

100

125
Image analysis

115
Credential

120
Supplemental
information

AR device

Remote server

100

130
Apply reliability model

135
Score indicator

AR device

Output component

100

150

Apply reliability model

AR device

155

Updated score indicator

Output component

200

200

200

220

220

240

240

240

600

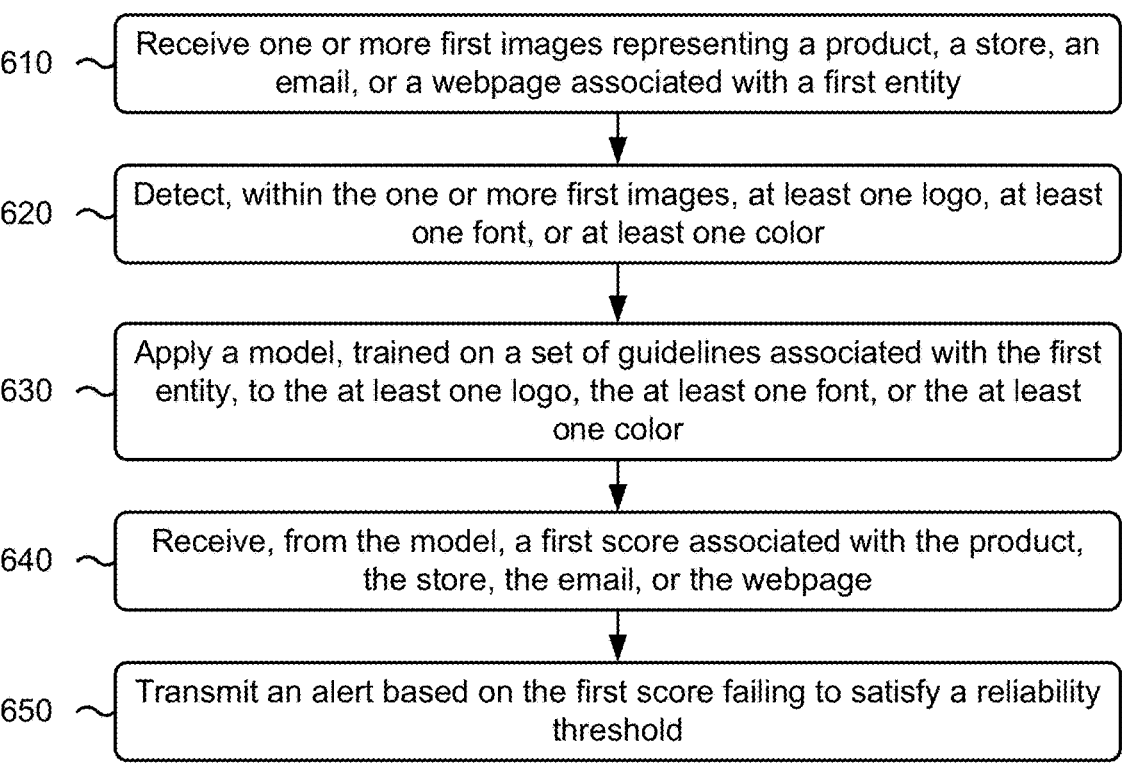

610 — Receive one or more first images representing a product, a store, an email, or a webpage associated with a first entity 620 — Detect, within the one or more first images, at least one logo, at least one font, or at least one color 630 — Apply a model, trained on a set of guidelines associated with the first entity, to the at least one logo, the at least one font, or the at least one color 640 — Receive, from the model, a first score associated with the product, the store, the email, or the webpage 650 — Transmit an alert based on the first score failing to satisfy a reliability threshold

FIG. 6

DETECTING RELIABILITY USING AUGMENTED REALITY

BACKGROUND

Reliable products and stores are sometimes difficult to distinguish from products and stores that copy branding (e.g., names, logos, or slogans). For example, an infringing entity may copy and use branding without authorization to do so from an entity that owns (or at least controls) the branding.

SUMMARY

Some implementations described herein relate to a system for using augmented reality (AR) to detect reliability. The system may include one or more memories and one or more processors communicatively coupled to the one or more memories. The one or more processors may be configured to receive, at an AR device, one or more first images representing a product or a store associated with a first entity. The one or more processors may be configured to detect, within the one or more first images, at least one logo. The one or more processors may be configured to apply a model, trained on a set of guidelines associated with the first entity, to the at least one logo as shown in the one or more first images. The one or more processors may be configured to receive, from the model, a first score associated with the product or the store. The one or more processors may be configured to receive, at the AR device, one or more second images further representing the product or the store associated with the first entity. The one or more processors may be configured to detect, within the one or more second images, the at least one logo. The one or more processors may be configured to apply the model to the at least one logo as shown in the one or more second images. The one or more processors may be configured to receive, from the model, a second score associated with the product or the store. The one or more processors may be configured to transmit, to the AR device, an alert based on the second score failing to satisfy a reliability threshold.

Some implementations described herein relate to a method of using AR to detect reliability. The method may include receiving, at an AR device, one or more first images representing a webpage associated with a first entity. The method may include detecting, within the one or more first images, at least one logo. The method may include detecting, within the one or more first images, at least one font. The method may include detecting, within the one or more first images, at least one color. The method may include applying a model, trained on a set of guidelines associated with the first entity, to the at least one logo, the at least one font, and the at least one color. The method may include receiving, from the model, a first score associated with the webpage. The method may include transmitting, to the AR device, an alert based on the first score failing to satisfy a reliability threshold.

Some implementations described herein relate to a non-transitory computer-readable medium that stores a set of instructions for using AR to detect reliability for a device. The set of instructions, when executed by one or more processors of the device, may cause the device to receive, at an AR device, one or more first images representing an email associated with a first entity. The set of instructions, when executed by one or more processors of the device, may cause the device to detect, within the one or more first images, at least one logo. The set of instructions, when executed by one or more processors of the device, may cause the device to detect, within the one or more first images, at least one font. The set of instructions, when executed by one or more processors of the device, may cause the device to detect, within the one or more first images, at least one color. The set of instructions, when executed by one or more processors of the device, may cause the device to apply a model, trained on a set of guidelines associated with the first entity, to the at least one logo, the at least one font, and the at least one color. The set of instructions, when executed by one or more processors of the device, may cause the device to receive, from the model, a first score associated with the email. The set of instructions, when executed by one or more processors of the device, may cause the device to transmit, to the AR device, an alert based on the first score failing to satisfy a reliability threshold.

BRIEF DESCRIPTION OF THE DRAWINGS

FIG. 6 is a flowchart of an example process relating to detecting reliability using AR, in accordance with some embodiments of the present disclosure.

DETAILED DESCRIPTION

Figure 1A:
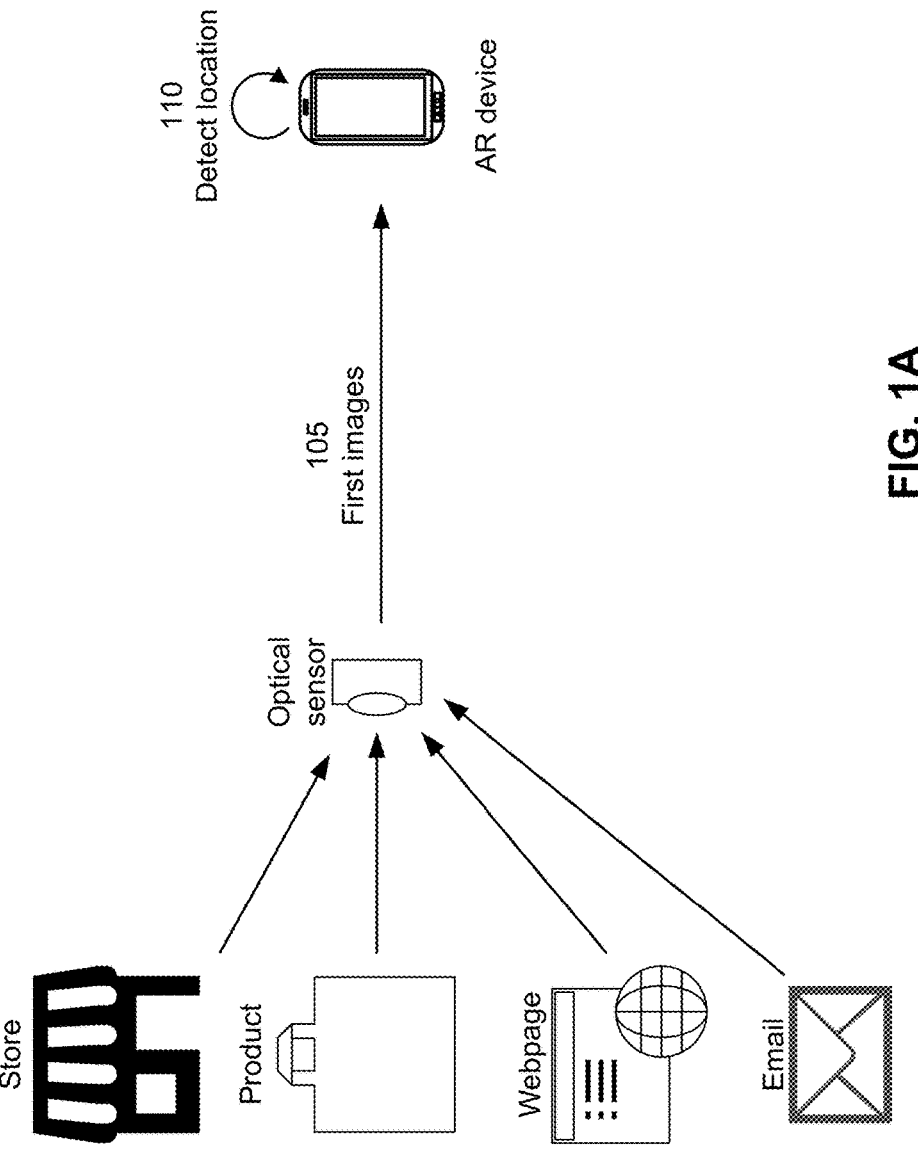
FIGS. 1A-1E are diagrams of an example implementation relating to detecting reliability using augmented reality (AR), in accordance with some embodiments of the present disclosure.

The following detailed description of example implementations refers to the accompanying drawings. The same reference numbers in different drawings may identify the same or similar elements.

An infringing entity may copy and use branding on a product or a store without authorization to do so from an entity that owns (or at least controls) the branding. One way to try and detect infringing products and stores is to train a machine learning model on a training set of labeled examples that includes infringing examples as well as reliable examples. Accordingly, the model may attempt to identify features of products and stores that are associated with infringement or general unreliability. However, training the machine learning model is computationally intense, and the machine learning model may inadvertently identify irrelevant features as indicative of infringement. Irrelevant features waste power and processing resources each time the machine learning model is executed.

Similarly, a bad actor may copy and use branding on a fraudulent email (e.g., a phishing email) or a fraudulent website (e.g., a scam website). Machine learning models attempt to classify emails and websites as fraudulent based on a training set of labeled examples that includes fraudulent examples as well as reliable examples. Accordingly, the model may attempt to identify features of emails and web-sites that are associated with fraud or general unreliability. However, training the machine learning model is computationally intense, and the machine learning model may inadvertently identify irrelevant features as indicative of fraud. Irrelevant features waste power and processing resources each time the machine learning model is executed.

Some implementations described herein provide a model trained on a set of guidelines to detect reliability. Training the model on the guidelines conserves power and processing resources as compared with training the model on a large training set of labeled examples of reliability and labeled examples of unreliability. Additionally, training the model on the guidelines reduces chances that the machine learning model will inadvertently identify irrelevant features as indicative of unreliability. Accordingly, power and processing resources will be conserved each time the machine learning model is executed.

In some implementations, the model may be applied by an augmented reality (AR) device to a product or to a store. For example, a user may capture images of the product or the store using the AR device such that the AR device displays an alert associated with reliability of the store or the product as an overlay. In some implementations, the model may be applied by an AR device to an email or to a webpage. For example, a user may capture images of the email or the webpage using the AR device such that the AR device displays an alert associated with reliability of the email or the webpage as an overlay.

FIGS. 1A-1E are diagrams of an example 100 associated with detecting reliability using AR. As shown in FIGS. 1A-1E, example 100 includes an AR device and a remote server. These devices are described in more detail in connection with FIGS. 4 and 5.

As shown in FIG. 1A and by reference number 105, an optical sensor may transmit, and the AR device may receive, first images (e.g., one or more first images). For example, the first images may represent a store (e.g., as shown in FIG. 2B), a product (e.g., as shown in FIG. 2E), a website (e.g., as shown in FIG. 2H), or an email (e.g., as shown in FIG. 2K), among other examples, associated with a first entity (e.g., "Capital One" in FIGS. 2B, 2E, 2H, and 2K). The AR device may instruct the optical sensor (e.g., by transmitting a command) to capture the first images. In some implementations, the optical sensor may capture the first images as a distinct set of images (e.g., by capturing a preconfigured quantity of images in response to the command). Alternatively, the optical sensor may capture the first images relatively continuously (e.g., at 15 frames per second, 20 frames per second, or 40 frames per second, among other examples) and stream the first images to the AR device. Accordingly, the AR device may pass the first images through to an output component (e.g., a display) of the AR device (e.g., as shown in FIGS. 2A-2L).

The optical sensor may be integrated with the AR device such that the AR device and the optical sensor communicate over a wired connection (e.g., one or more buses). Alternatively, the optical sensor may be at least partially separate (e.g., physically, logically, and/or virtually) from the AR device. Accordingly, the AR device and the optical sensor may communicate over a wired connection (e.g., a universal serial bus (USB) connection) or a wireless connection (e.g., a Bluetooth® connection).

Additionally, in some implementations, as shown by reference number 110, the AR device may detect a location associated with the AR device. For example, the AR device may use a global positioning system (GPS) or another type of global navigation satellite system (GNSS) to determine the location of the AR device. The location may be determined as a set of coordinates (e.g., in a geocentric coordinate system, a geodetic coordinate system, or a local tangent plane coordinate system, among other examples). Alternatively, the location may be determined as a geographic zone (e.g., selected from a plurality of possible geographic zones) in which the AR device is located (e.g., within a margin of error).

Figure 1B:
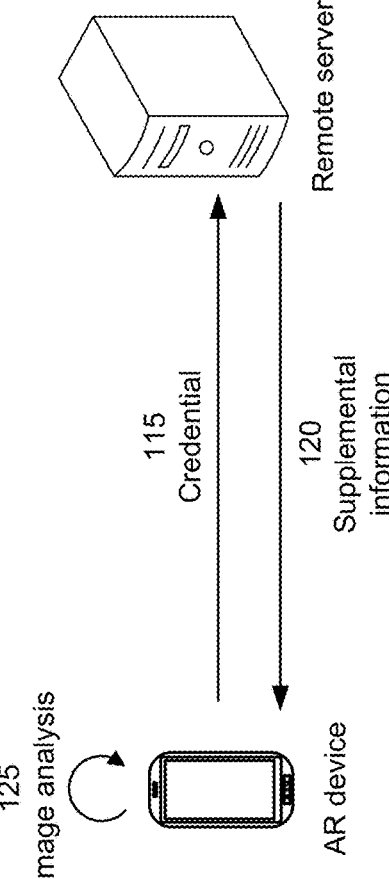

As shown in FIG. 1B and by reference number 115, the AR device may transmit, and the remote server may receive, a credential. For example, the credential may include a username (optionally with a password), a key, a certificate, a medium access control (MAC) address, an Internet protocol (IP) address, a device name, and/or another type of information uniquely identifying the AR device and/or the user thereof (or at least quasi-uniquely identifying the AR device and/or the user thereof). The credential may be included in a request, from the AR device, for supplemental information associated with the first entity. The AR device may transmit the request based on identifying the first entity within the first images. The AR device may identify the first entity based on detecting a company name, a company slogan, and/or another piece of information purporting to be associated with the first entity within the first images. In one example, the AR device may detect a company name (such as "Capital One"®) within the first images. In another example, the AR device may detect a slogan (such as "What's In Your Wallet?"®) within the first images. In another example, the AR device may detect a logo within the first images and identify the first entity based on the logo (e.g., using a database or another similar data structure that associates logos with entity names).

The remote server may assign the credential when the AR device and/or the user registered for a service provided by the remote server. For example, the user may have accessed a website maintained by (or at least associated with) the remote server in order to register the user and/or the AR device for the service provided by the remote server. Accordingly, the remote server may have transmitted the credential to the user (e.g., via the AR device or via another user device) for later use.

As shown by reference number 120, the remote server may transmit, and the AR device may receive, supplemental information associated with the first entity. For example, the supplemental information may include a map (or a list or another similar data structure) indicating store locations authorized by the first entity. In another example, the supplemental information may include a list (or an array or another similar data structure) indicating products (e.g., by listing product names and/or descriptions) authorized by the first entity. In another example, the supplemental information may include a list (or an array or another similar data structure) indicating subject lines of emails sent by the first entity. In another example, the supplemental information may include a list (or an array or another similar data structure) indicating uniform resource locators (URLs) used by the first entity.

As shown by reference number 125, the AR device may perform image analysis on the first images. For example, the AR device may apply filters; artificial neural networks (ANNs), such as convolutional neural networks (CNNs); and/or video tracking or motion detection models, among other examples.

By using image analysis, the AR device may detect, within the first images, a logo (e.g., at least one logo). For example, the AR device may apply a Viola—Jones object detection framework based on Haar features, a scale-invariant feature transform (SIFT) model, a Single Shot MultiBox Detector (SSD), or a You Only Look Once (YOLO) model, among other examples, to detect the logo. The AR device may also determine bounding boxes (e.g., at least one bounding box corresponding to at least one of the first images) associated with the logo. Accordingly, the AR device may extract the logo by cropping the first images according to the bounding boxes.

In some implementations, the AR device may additionally detect a placement and a size associated with the logo. For a product, the AR device may estimate the placement of the logo relative to features of the product (e.g., if the logo is on a bottom surface of the product, if the logo is on a side surface of the product, an estimated distance between the logo and a name printed on the product, or if the logo is on a top surface of the product, among other examples). For a store, the AR device may estimate the placement of the logo relative to features of the store (e.g., if the logo is on a back wall of the store, if the logo is on or above an entryway to the store, an estimated distance between the logo and an entryway, or if the logo is on a floor of the store, among other examples). For an email, the AR device may estimate placement of the logo relative to features of the email (e.g., if the logo is at the top of the email, if the logo is at the bottom of the email, or an estimated distance between the logo and nearby text, among other examples). For a webpage, the AR device may estimate placement of the logo relative to features of the webpage (e.g., if the logo is at the top of the webpage, if the logo is centered on the webpage, or an estimated distance between the logo and nearby text, among other examples). With respect to the size of the logo, the AR device may estimate a real size (e.g., using a reference, such as a feature of the product or the store) and/or a pixel size (e.g., using a reference, such as a size of a screen displaying the email or the webpage). Additionally, or alternatively, the AR device may detect a spacing (e.g., at least one spacing) associated with the logo. For example, the AR device may estimate (e.g., in real distance and/or in pixel distance) an amount of white space between the logo and a nearby feature (e.g., a color, text, or an image, among other examples).

Additionally, or alternatively, by using image analysis, the AR device may detect, within the first images, a color (e.g., at least one color). For example, the AR device may determine a red green blue (RGB) color value and/or a hexadecimal code associated with the color. For an email or a webpage, the AR device may additionally obtain (e.g., over the Internet) code associated with the email or the webpage so that the AR device may determine the RGB color value and/or the hexadecimal code associated with the color from the code. For example, the user may input a URL associated with the webpage so that the AR device may obtain the code associated with the webpage. In another example, the user may forward the email to an inbox to which the AR device has access so that the AR device may read the code associated with the email.

In some implementations, the AR device may analyze the first images for colors other than whites and blacks. Additionally, or alternatively, the AR device may analyze a portion of first images for colors associated with the product, the store, the email, or the webpage. For example, the AR device may crop the first images according to bounding boxes (e.g., at least one bounding box corresponding to at least one of the first images) associated with the product, store, the email, or the webpage (e.g., the bounding boxes being determined as described above).

Additionally, or alternatively, by using image analysis, the AR device may detect, within the first images, a font (e.g., at least one font). For example, the AR device may estimate the font based on detecting shapes of one or more letters printed on the product or the store or included in the email or the webpage. For an email or a webpage, the AR device may additionally obtain code associated with the email or the webpage (e.g., as described above) so that the AR device may determine the font from the code.

In some implementations, the AR device may additionally detect a white space measurement (e.g., one or more white space measurements) associated with text. For example, the first images may include text that the AR device detects (e.g., using optical character recognition (OCR)), and the AR device may estimate white space between the detected text and other features (e.g., the logo, a border, a menu, or an image, among other examples). Additionally, or alternatively, the AR device may estimate white space between one portion of the detected text and another portion of the detected text (e.g., between a header and a paragraph, between paragraphs, or between a paragraph and fine print, among other examples).

Additionally, or alternatively, the AR device may transcribe the detected text (e.g., using OCR). Accordingly, the AR device may determine unique words (optionally with a frequency thereof) in the text. Additionally, or alternatively, the AR device may apply sentiment analysis to the text to determine a tone associated with the text. For example, the AR device may apply natural language processing (NLP) to determine a score associated with the text (e.g., a score reflecting positivity of the tone or another measure of the tone) and/or a tonal category (e.g., one or more categories) associated with the text (e.g., happy, sad, objective, subjective, informational, or persuasive, among other examples).

Additionally, or alternatively, the AR device may detect a URL in the first images. For example, the transcribed text may include a string that matches a pattern associated with URLs (e.g., beginning with "http:" or "www." or including ".com" and forward slashes or terminating in ".htm" or ".html" among other examples). Additionally, or alternatively, the AR device may detect an email address in the first images. For example, the transcribed text may include a string that matches a pattern associated with email addresses (e.g., including "@" or terminating in ".com" among other examples).

Figure 1C:
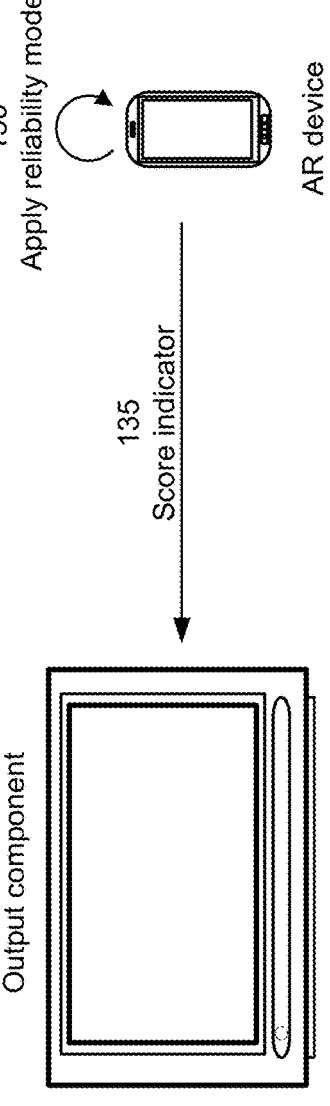

As shown in FIG. 1C and by reference number 130, the AR device may apply a model, trained on a set of guidelines associated with the first entity, to determine a reliability associated with the product, the store, the email, or the webpage. For example, the model may be trained as described in connection with FIG. 3A and applied as described in connection with FIG. 3B. The AR device may determine the first entity, as described above, and select the model to apply using a data structure that links entity names to indications of possible models to apply.

The AR device may apply the model to the logo, the color, the font, and/or any additional factors, from the image analysis described above, that are detected in the first images. Accordingly, the model may determine a reliability score (for the product, the store, the email, or the webpage) based on a similarity between the logo, the color, the font, and/or the additional factors and what is expected based on the set of guidelines associated with the first entity.

In some implementations, the model may be additionally trained on a set of images (e.g., of products, stores, emails, or webpages) associated with the first entity. For example, the set of images may include published copy authorized by the first entity. Accordingly, the model may determine a reliability score (for the product, the store, the email, or the webpage) based on a similarity between the logo, the color, the font, and/or the additional factors and previously published copy from the first entity. Additionally, or alternatively, the model may accept the location (e.g., as described in connection with reference number 110) and/or the supplemental information (e.g., from the remote server as described in connection with reference number 120) as input. Accordingly, the reliability score may be further based on whether the location (e.g., determined by the AR device and associated with the store) is included in a list of authorized locations by the first entity, whether a subject line (e.g., detected in the email) in included in a list of subject lines used by the first entity, whether a URL (e.g., detected in the webpage) is included in a list of URLs used by the first entity, or whether a product name or description (e.g., associated with the product) is included in a list of names or descriptions authorized by the first entity, among other examples.

In addition to the reliability score, the model may further output information identifying an entity most likely to be associated with the product, the store, the email, or the webpage. For example, when the reliability score satisfies a reliability threshold, the entity most likely to be associated with the product, the store, the email, or the webpage may be the first entity. On the other hand, when the reliability score fails to satisfy the reliability threshold, the entity most likely to be associated with the product, the store, the email, or the webpage may be a different entity (e.g., an infringing company or a known scam or fraud, among other examples).

As shown by reference number 135, the AR device may transmit, to an output component, an indication of the reliability score. For example, the output component may display the reliability score and/or may display a visual indicator of whether the reliability score satisfies the reliability threshold (e.g., as shown in FIGS. 2C, 2F, 2I, and 2L). In some implementations, the output component may further display a name of the entity most likely to be associated with the product, the store, the email, or the webpage.

The output component may be integrated with the AR device such that the AR device and the output component communicate over a wired connection (e.g., one or more buses). Alternatively, the output component may be at least partially separate (e.g., physically, logically, and/or virtually) from the AR device. Accordingly, the AR device and the output component may communicate over a wired connection (e.g., a USB connection) or a wireless connection (e.g., a Bluetooth connection).

Figure 1D:
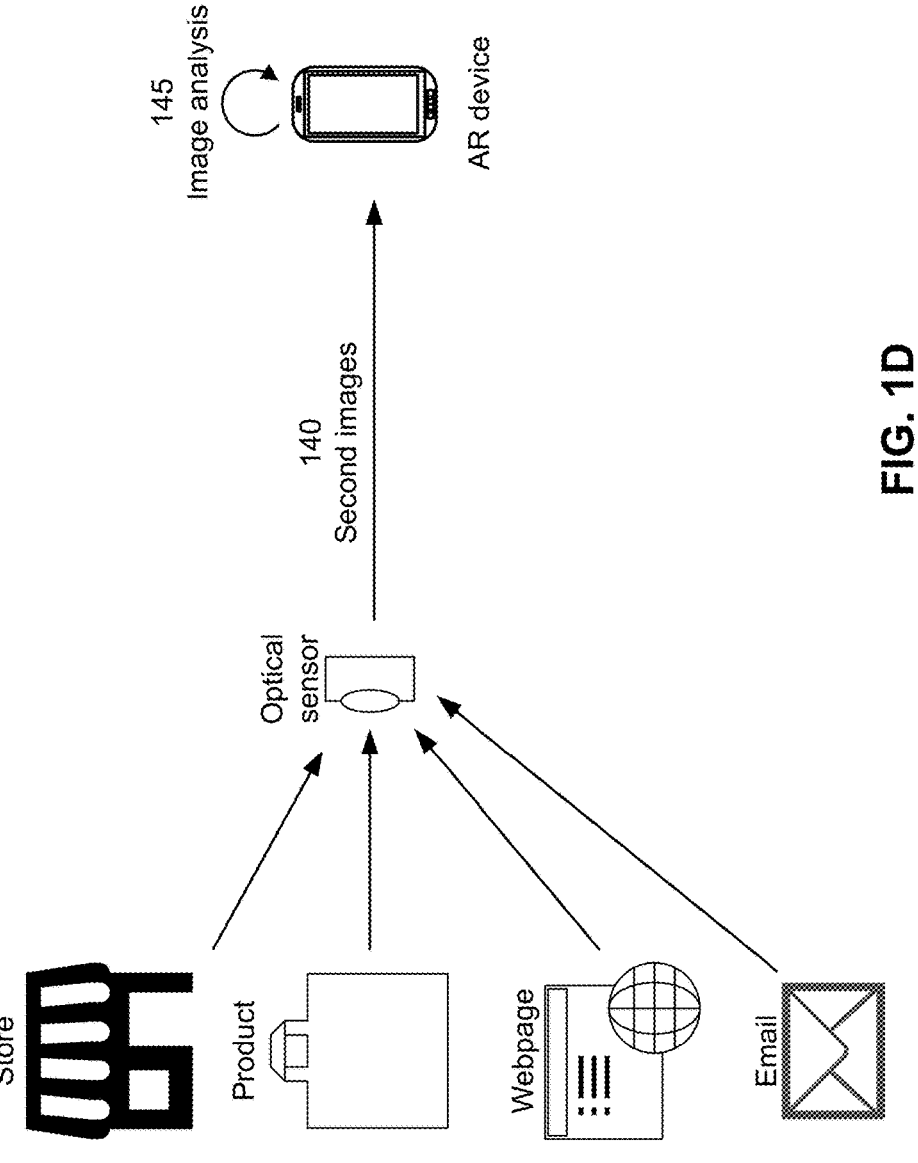

In some implementations, the AR device may periodically (or relatively continuously) update the reliability score. For example, as shown in FIG. 1D and by reference number 140, the AR device may receive second images (e.g., one or more second images) further representing the product, the store, the email, or the webpage. Moreover, as shown by reference number 145, the AR device may perform image analysis on the second images. The image analysis may be similar to the image analysis described above in connection with the first images.

Figure 1E:
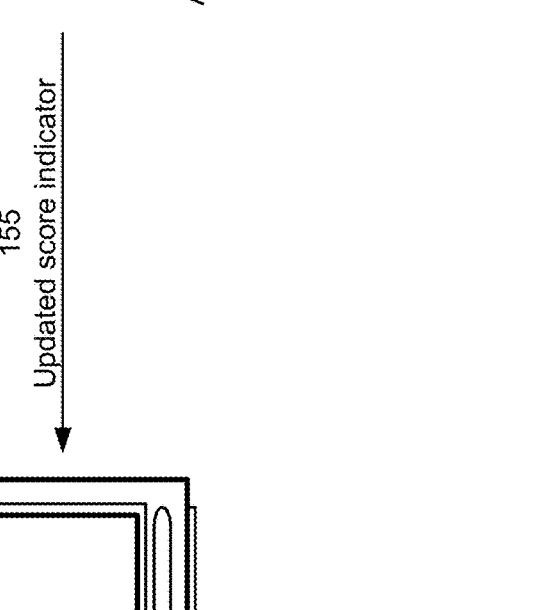

As shown in FIG. 1E and by reference number 150, the AR device may apply the model to determine an updated reliability associated with the product, the store, the email, or the webpage. The AR device may apply the model to a logo, a color, and/or a font detected in the second images (optionally with any additional factors, from the image analysis described above, that are detected in the second images). Accordingly, the model may determine an updated reliability score for the product, the store, the email, or the webpage.

As shown by reference number 155, the AR device may transmit, to the output component, an indication of the updated reliability score. For example, the output component may display the updated reliability score and/or may display a visual indicator of whether the updated reliability score satisfies the reliability threshold (e.g., as shown in FIGS. 2C, 2F, 2I, and 2L). In some implementations, the output component may further display a name of the entity most likely to be associated with the product, the store, the email, or the webpage.

By using techniques as described in connection with FIGS. 1A-1E, the AR device determines reliability (of the product, the store, the email, or the webpage) using the model on the set of guidelines associated with the first entity. Training the model on the guidelines conserves power and processing resources as compared with training the model on a large training set of labeled examples. Additionally, training the model on the guidelines reduces chances that the model will inadvertently identify irrelevant features as indicative of unreliability. Accordingly, the AR device conserves power and processing resources each time the model is executed.

As indicated above, FIGS. 1A-1E are provided as an example. Other examples may differ from what is described with regard to FIGS. 1A-1E.

FIGS. 2A-2C, 2D-2F, 2G-2I, and 2J-2L are diagrams of examples 200, 220, 240, and 260, respectively associated with detecting reliability using AR. Examples 200, 220, 240, and 260 may be performed using an AR device, which is described in more detail in connection with FIGS. 4 and 5.

Figure 2A:
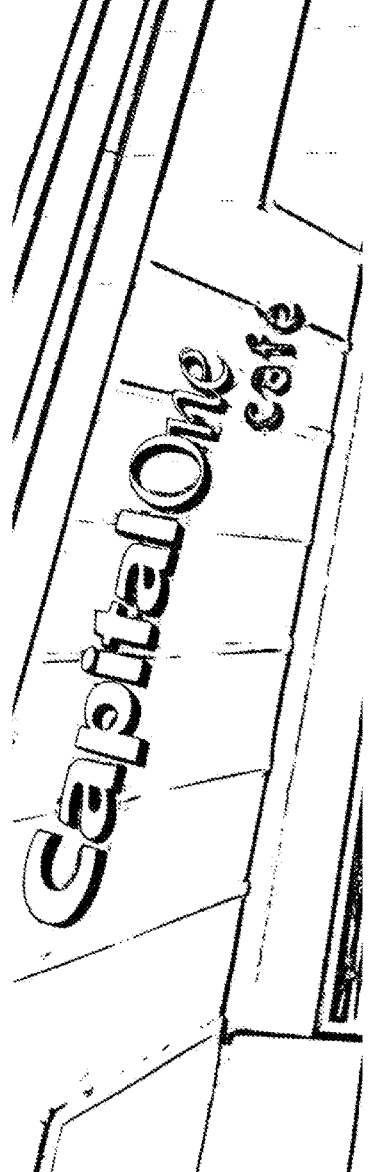
FIGS. 2A-2L are diagrams of example implementations relating to detecting reliability using AR, in accordance with some embodiments of the present disclosure.
Figure 2B:
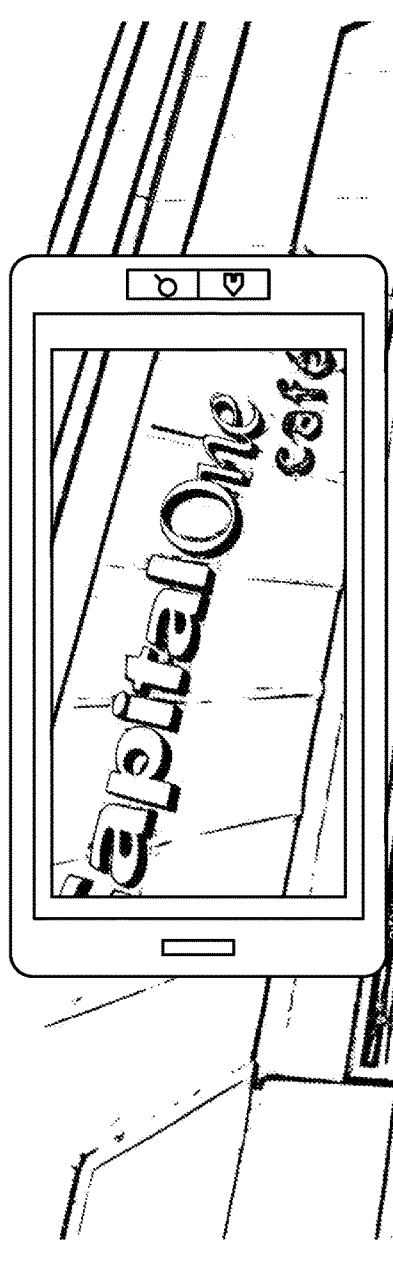
Figure 2B:

As shown in FIG. 2A, example 200 is based on a store (a Capital One Café in FIG. 2A). For example, a user may be outside the store and have a line of sight to a storefront, as shown in FIG. 2A. Alternatively, the user may be inside the store.

As shown in FIG. 2B, the user may point the AR device toward the storefront (or another portion of the store). For example, an optical sensor of the AR device may capture images (e.g., one or more images) of the store and pass the images through to a display of the AR device.

Figure 2C:
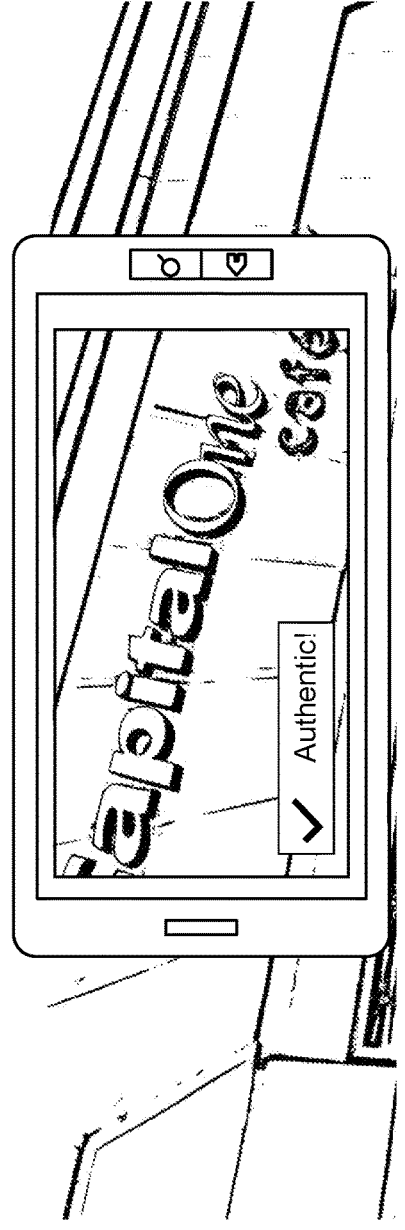

Accordingly, the AR device may analyze the images and apply a model to the images as described in connection with reference numbers 125 and 130. Based on a reliability score output by the model, the AR device may output a visual indicator to the display of the AR device, as shown in FIG. 2C. In example 200, the model may output a reliability score that satisfies a threshold such that the visual indicator is associated with reliability of the store. For example, the logo over the storefront may be determined as reliable (e.g., based on a size, placement, color, and/or content of the logo) in example 200. Thus, the visual indicator, in example 200, is shown as an overlay that indicates "Authentic!" and includes a checkmark.

Figure 2D:
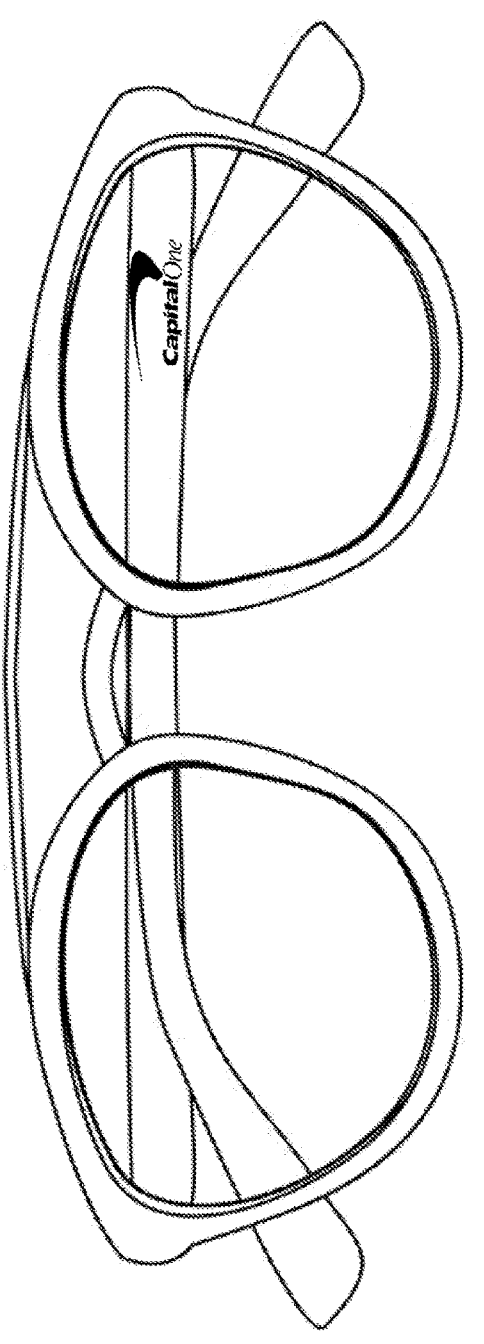
Figure 2E:
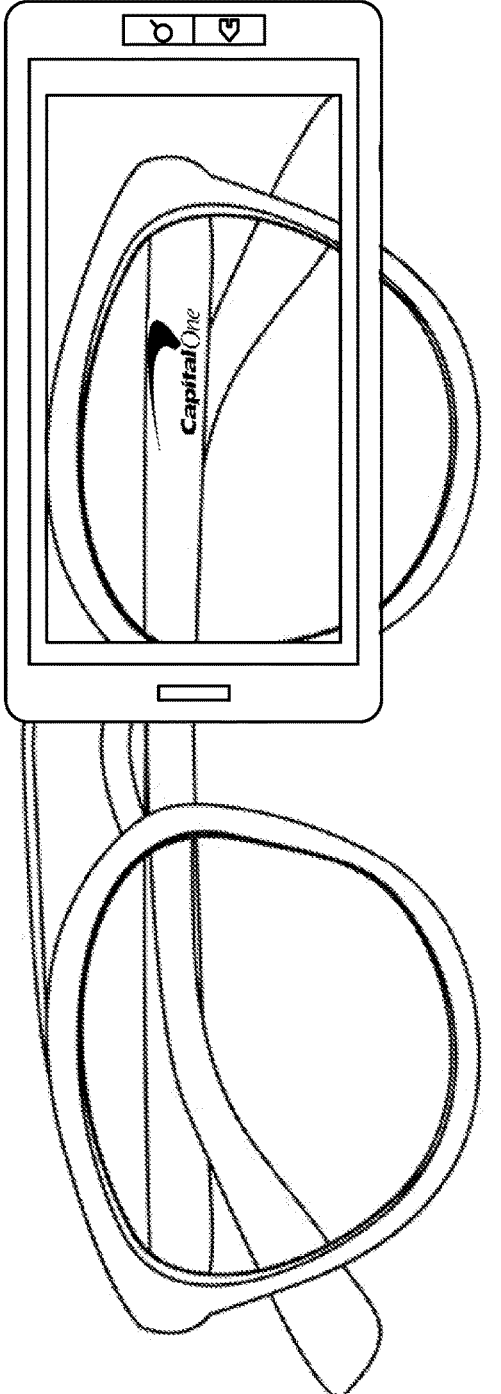
Figure 2F:
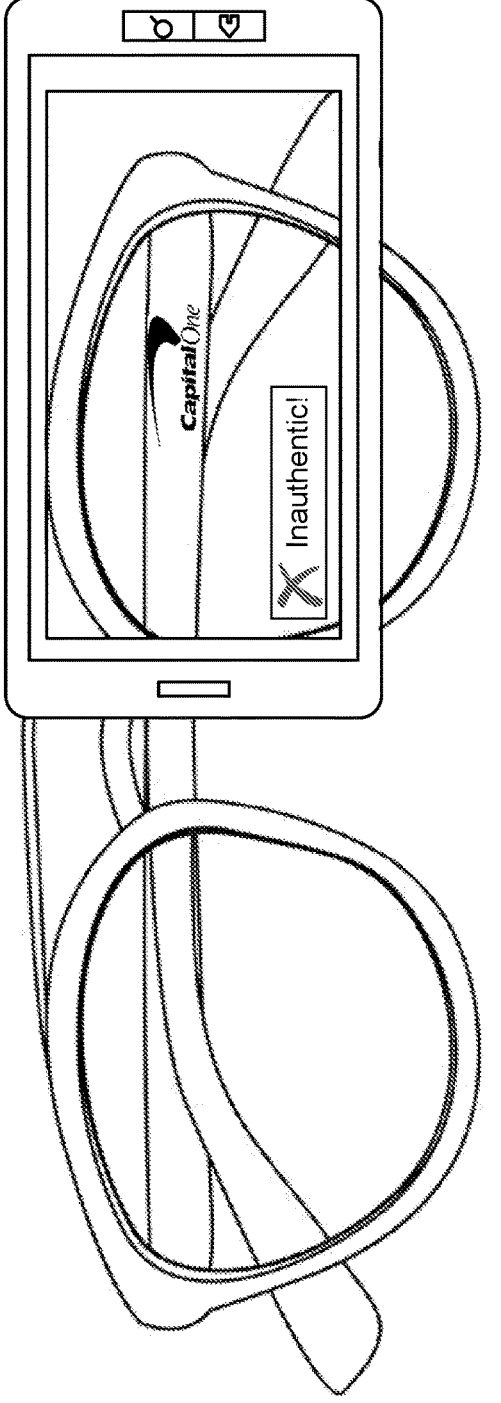

As shown in FIG. 2D, example 220 is based on a product (a pair of sunglasses in FIG. 2D). As shown in FIG. 2E, the user may point the AR device toward the product. For example, the optical sensor of the AR device may capture images (e.g., one or more images) of the product and pass the images through to a display of the AR device.

Accordingly, the AR device may analyze the images and apply a model to the images as described in connection with reference numbers 125 and 130. Based on a reliability score output by the model, the AR device may output a visual indicator to the display of the AR device, as shown in FIG.

2F. In example 220, the model may output a reliability score that fails to satisfy a threshold such that the visual indicator is associated with unreliability of the product. For example, the logo on the product may be determined as unreliable (e.g., based on a size, placement, color, and/or content of the logo) in example 220. Thus, the visual indicator, in example 220, is shown as an overlay that indicates "Inauthentic!" and includes an "X" mark.

Figure 2G:
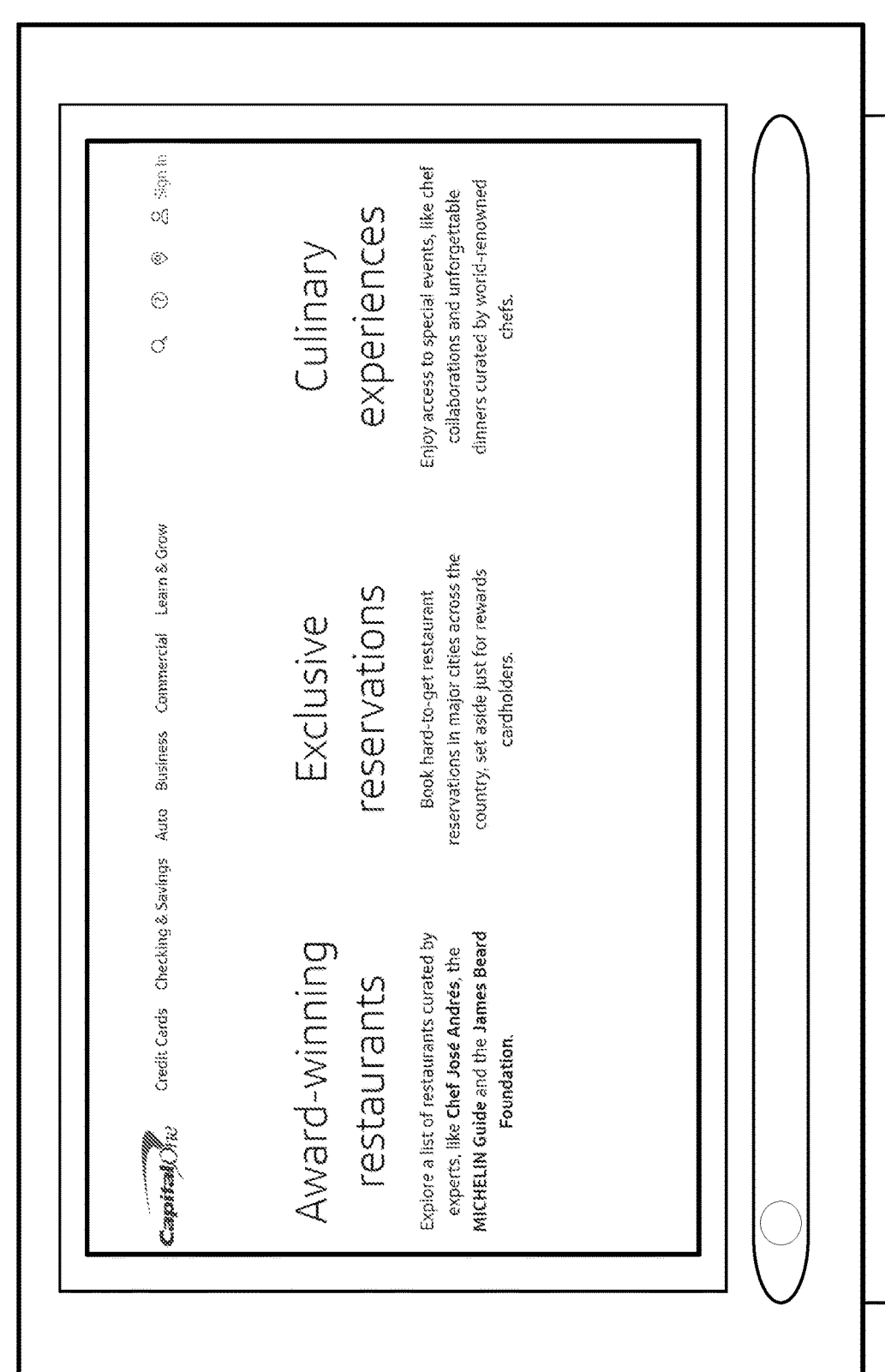
Figure 2H:
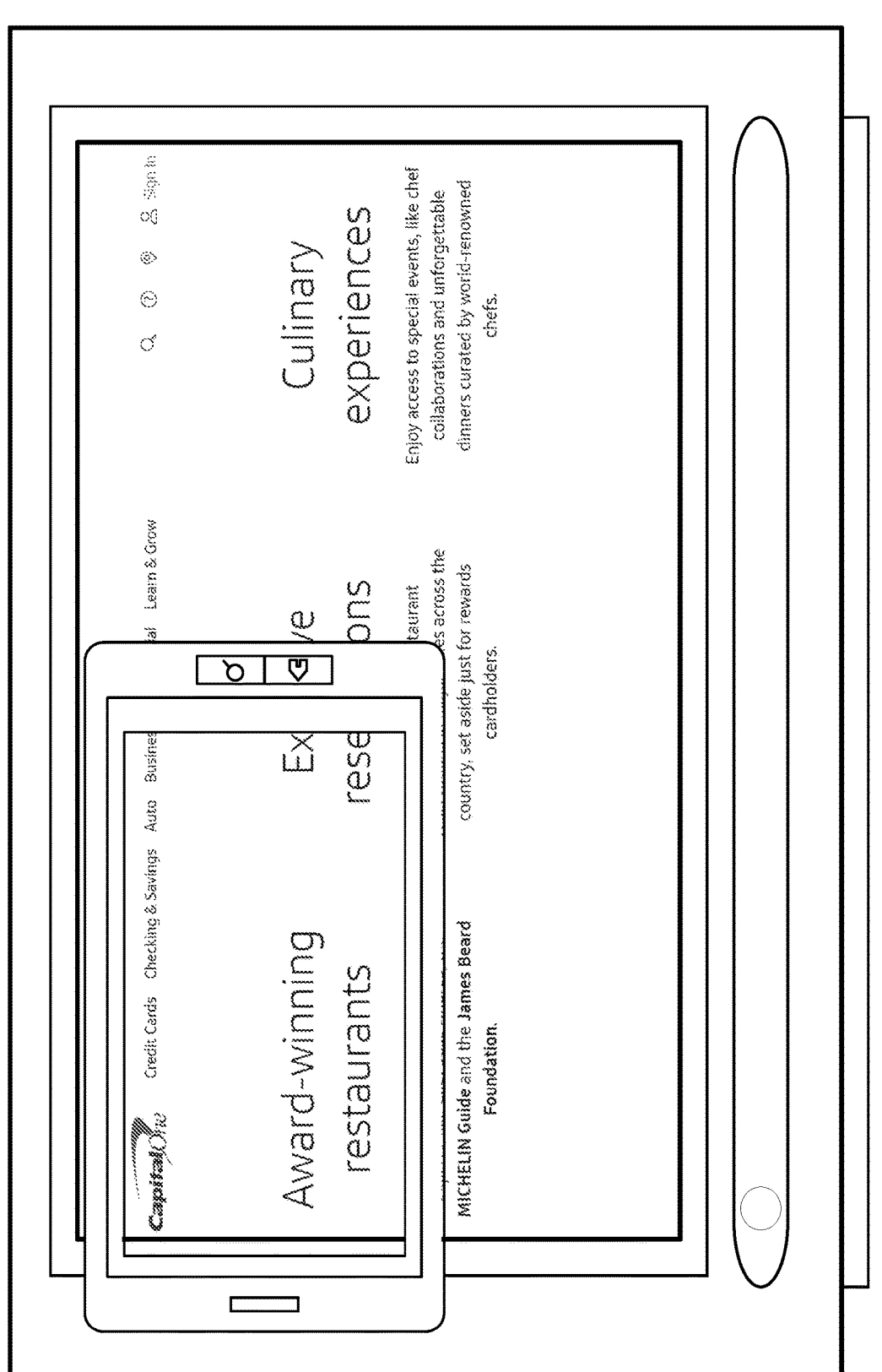

As shown in FIG. 2G, example 240 is based on a webpage (Capital One Dining in FIG. 2G). For example, the webpage may be displayed on a user device, which is described in more detail in connection with FIGS. 4 and 5.

As shown in FIG. 2H, the user may point the AR device toward the webpage. For example, the optical sensor of the AR device may capture images (e.g., one or more images) of the webpage as displayed by the user device and pass the images through to a display of the AR device.

Figure 2I:
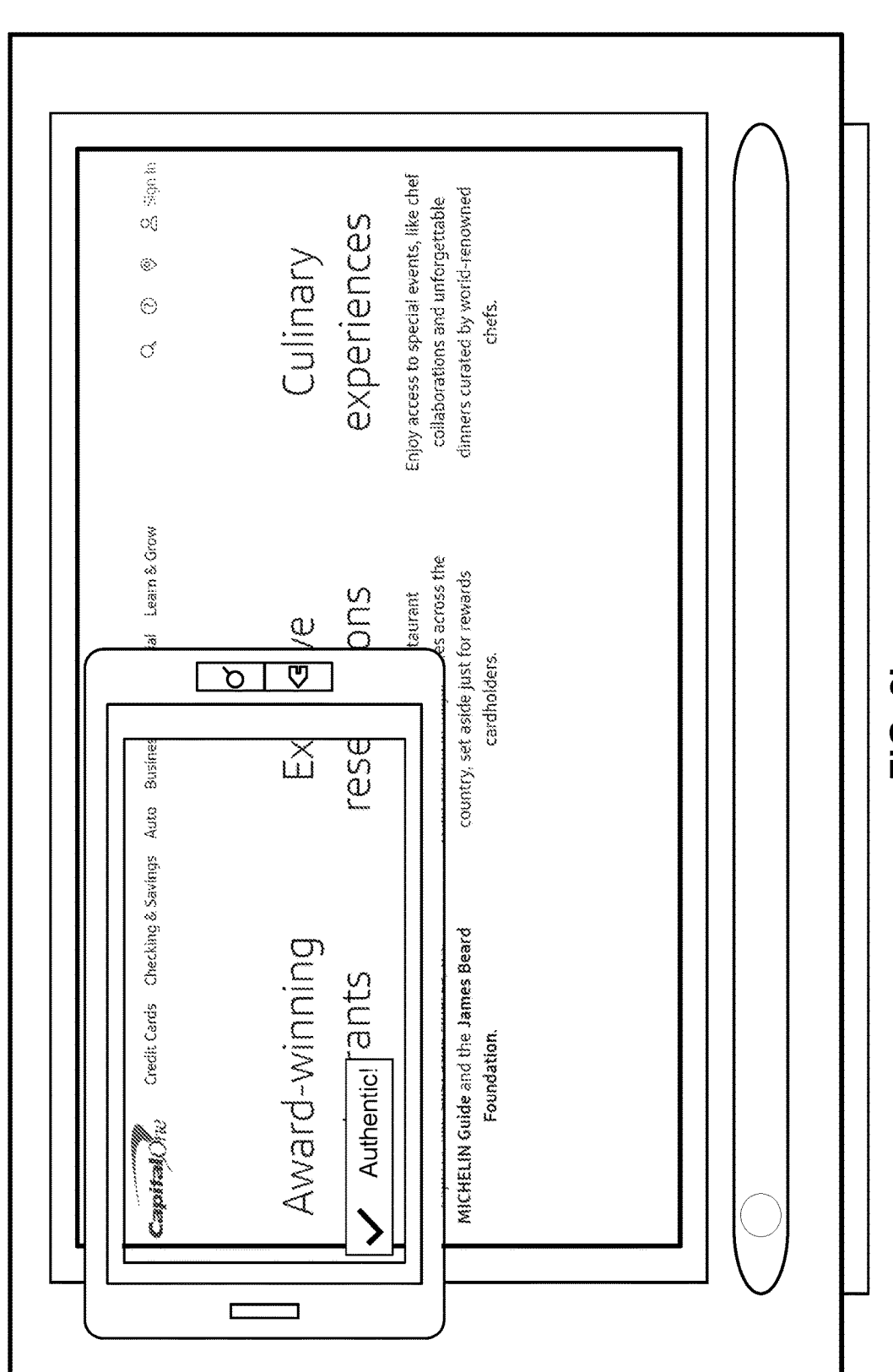

Accordingly, the AR device may analyze the images and apply a model to the images as described in connection with reference numbers 125 and 130. Based on a reliability score output by the model, the AR device may output a visual indicator to the display of the AR device, as shown in FIG. 2I. In example 240, the model may output a reliability score that satisfies a threshold such that the visual indicator is associated with reliability of the webpage. For example, the logo on the webpage may be determined as reliable (e.g., based on a size, placement, color, and/or content of the logo), and/or the text on the webpage may be determined as reliable (e.g., based on unique words, word frequency, a tone associated with the text, and/or white space associated with the text), in example 240. Thus, the visual indicator, in example 240, is shown as an overlay that indicates "Authentic!" and includes a checkmark.

Figure 2J:
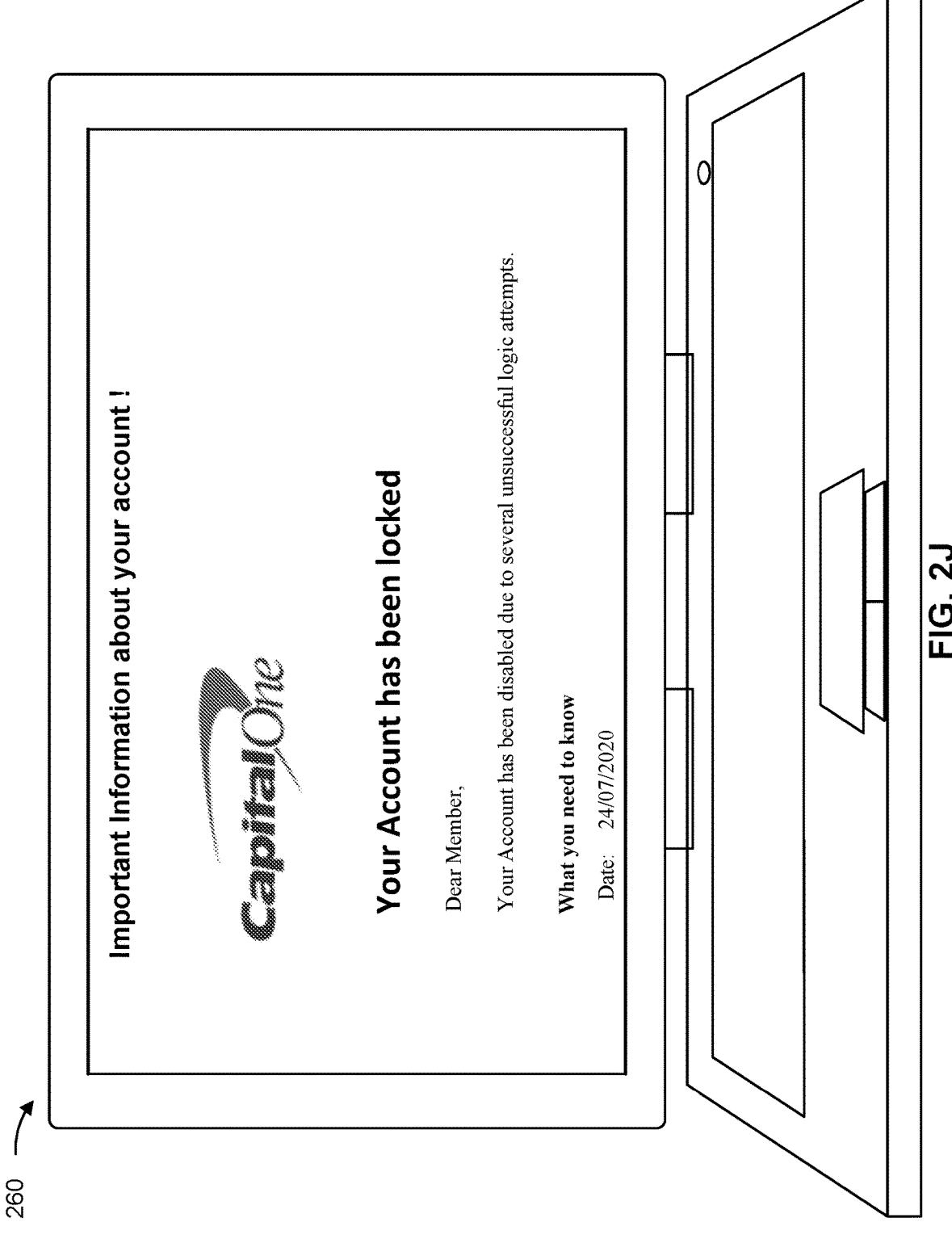
Figure 2K:
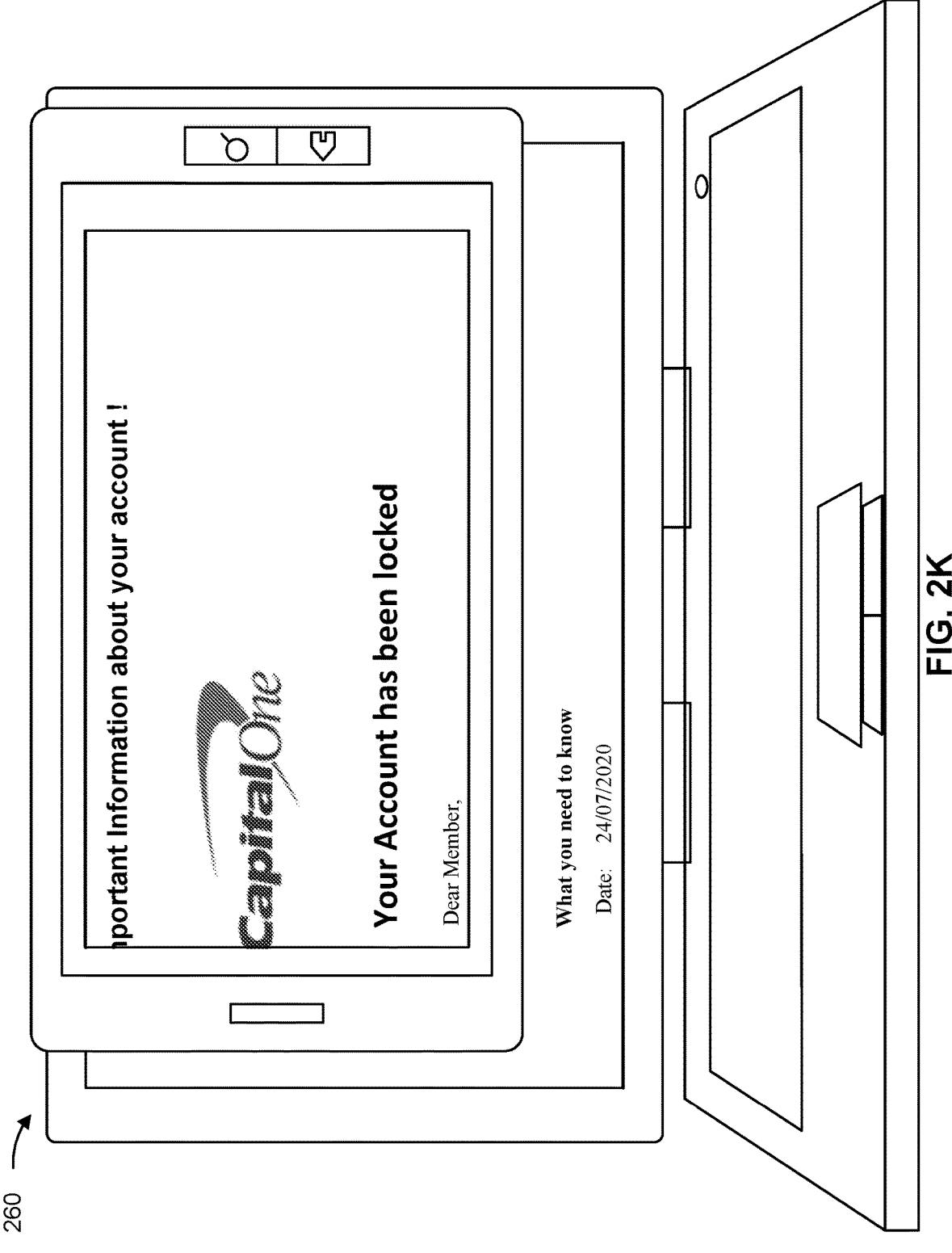

As shown in FIG. 2J, example 260 is based on an email. For example, the email may be displayed on the user device. As shown in FIG. 2K, the user may point the AR device toward the email. For example, the optical sensor of the AR device may capture images (e.g., one or more images) of the email as displayed by the user device and pass the images through to a display of the AR device.

Figure 2L:
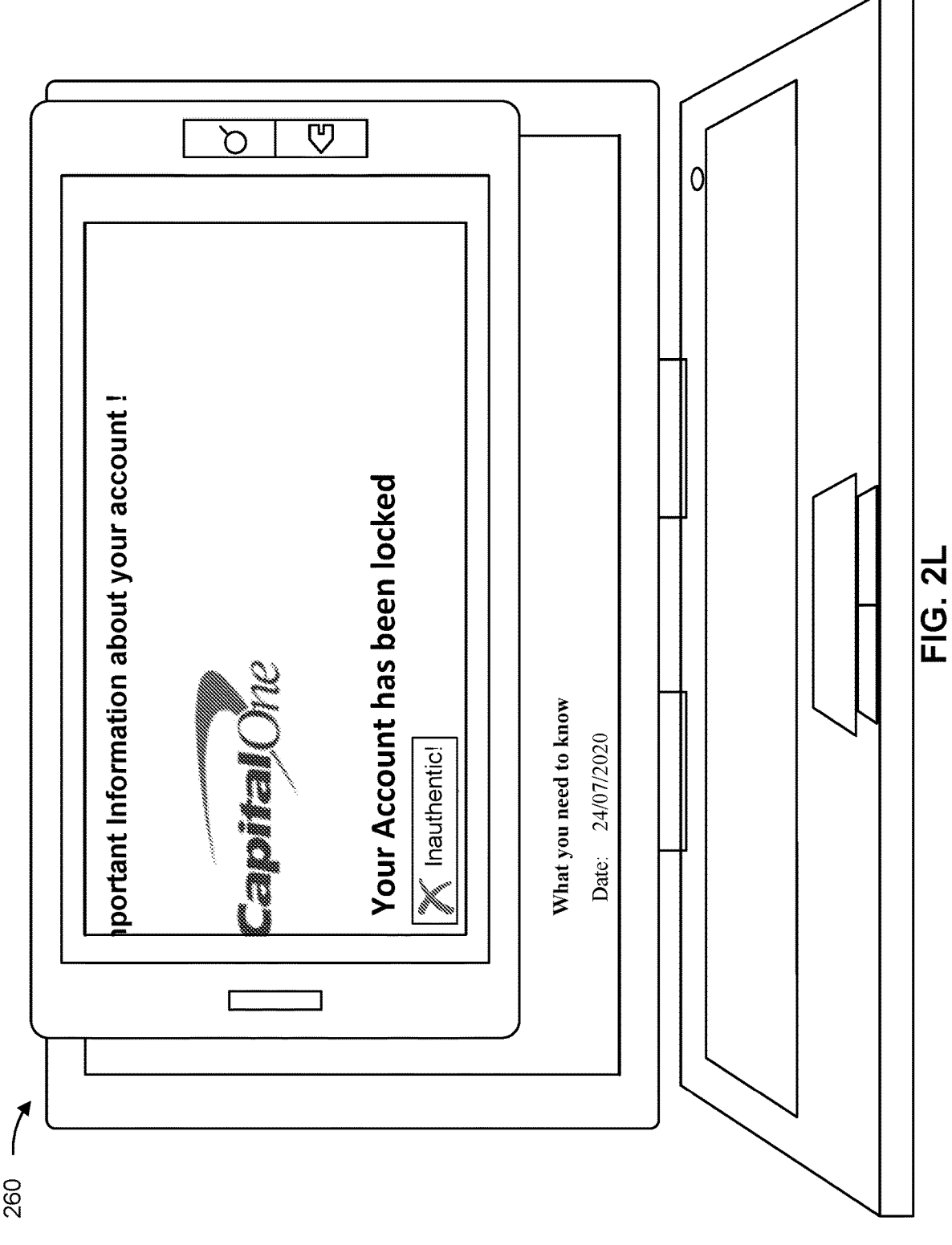

Accordingly, the AR device may analyze the images and apply a model to the images as described in connection with reference numbers 125 and 130. Based on a reliability score output by the model, the AR device may output a visual indicator to the display of the AR device, as shown in FIG. 2L. In example 260, the model may output a reliability score that fails to satisfy a threshold such that the visual indicator is associated with unreliability of the email. For example, the logo on the email may be determined as reliable (e.g., based on a size, placement, color, and/or content of the logo), and/or the text on the email may be determined as reliable (e.g., based on unique words, word frequency, a tone associated with the text, and/or white space associated with the text), in example 260. Thus, the visual indicator, in example 260, is shown as an overlay that indicates "Inauthentic!" and includes an "X" mark.

As indicated above, FIGS. 2A-2L are provided as examples. Other examples may differ from what is described with regard to FIGS. 2A-2L.

Figure 3A:
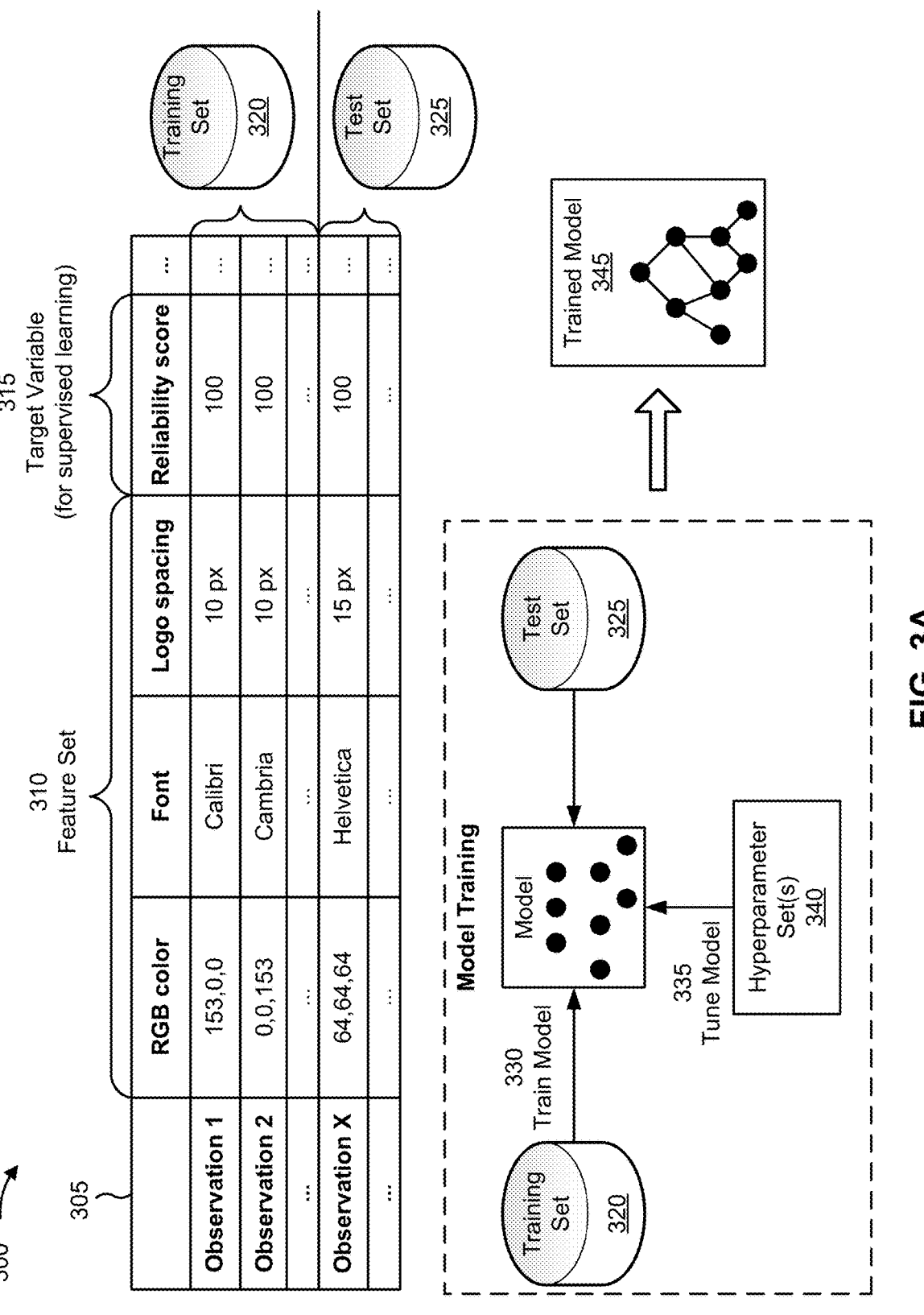
FIGS. 3A-3B are diagrams illustrating an example of training and using a machine learning model in connection with detecting reliability using AR, in accordance with some embodiments of the present disclosure.
Figure 3B:
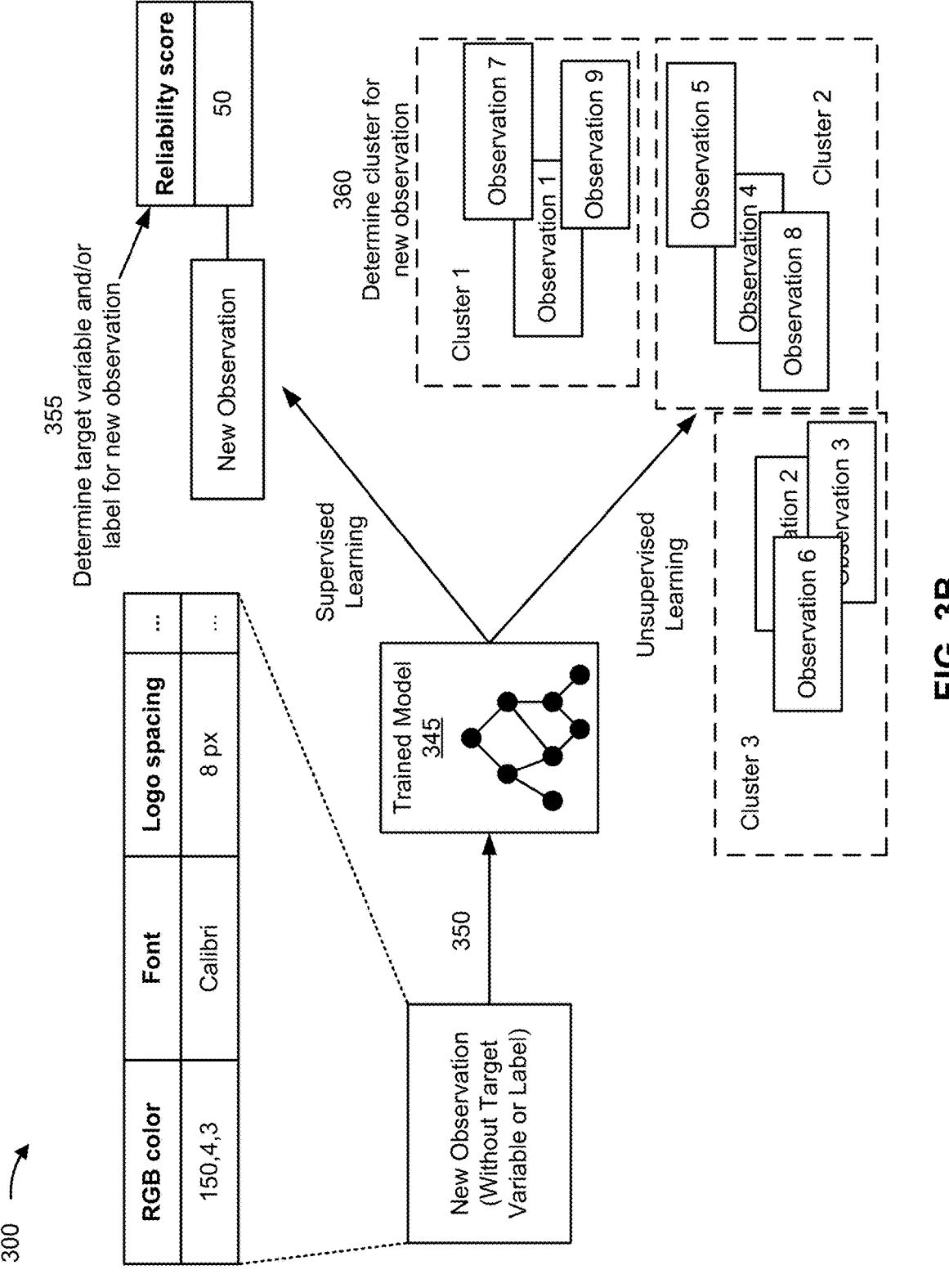

FIGS. 3A-3B are diagrams illustrating an example 300 of training and using a machine learning model in connection with detecting reliability using AR. The machine learning model training described herein may be performed using a machine learning system. The machine learning system may include or may be included in a computing device, a server, a cloud computing environment, or the like, such as an AR device described in more detail below.

As shown by reference number 305, a machine learning model may be trained using a set of observations. The set of observations may be obtained and/or input from training data (e.g., historical data), such as data gathered during one or more processes described herein. For example, the set of observations may include data gathered from the AR device, as described elsewhere herein. In some implementations, the machine learning system may receive the set of observations (e.g., as input) from the AR device (and/or a remote server).

As shown by reference number 310, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the AR device. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a color (e.g., an RGB value), a second feature of a font, a third feature of a spacing associated with a logo, and so on. As shown, for a first observation, the first feature may have a value of (153,0,0), the second feature may have a value of Calibri, the third feature may have a value of 10 pixels, and so on. These features and feature values are provided as examples, and may differ in other examples. For example, the feature set may include one or more of the following features: a tone associated with text, unique words included in text, a word frequency associated with text, a white space measurement associated with text, a size associated with the logo, a placement associated with the logo, a size associated with text, a URL, an email address, a subject line, or a location, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 315, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 300, the target variable is a reliability score, which has a value of 100 for the first observation. The set of observations may all be associated with reliability scores of 100 when the set of observations are based on a set of guidelines (e.g., style guidelines). The set of observations may be associated with reliability scores of less than 100 when the set of observations are based on previously published copy.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that may include a first subset of observations, of the set of observations, and a test set 325 that may include a second subset of observations of the set of observations. The training set 320 may be used to train (e.g., fit or tune) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used and/or based on randomly generating hyperparameter values). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups and/or based on randomly selecting a number of groups) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, or closest to a desired threshold) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 345 to be used to analyze new observations, as described below in connection with FIG. 3B.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 345.

FIG. 3B is a diagram illustrating applying the trained machine learning model 345 to a new observation. As shown by reference number 350, the machine learning system may receive a new observation (or a set of new observations), and may input the new observation to the machine learning model 345. As shown, the new observation may include a first feature of (150,4,3), a second feature of Calibri, a third feature of 8 pixels, and so on, as an example. The machine learning system may apply the trained machine learning model 345 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 345 may predict a value of 50 for the target variable of a reliability score for the new observation, as shown by reference number 355. Based on this prediction (e.g., based on the value having a particular label or classification or based on the value satisfying or failing to satisfy a threshold), the machine learning system may provide a recommendation and/or output for determination of a recommendation, such as an indication of unreliability. Additionally, or alternatively, the machine learning system may perform an automated action and/or may cause an automated action to be performed (e.g., by instructing another device to perform the automated action), such as displaying a visual alert (and/or playing an audible alert) that the new observation is unreliable. As another example, if the machine learning system were to predict a value of 98 for the target variable of a reliability score, then the machine learning system may provide a different recommendation (e.g., an indication of reliability) and/or may perform or cause performance of a different automated action (e.g., displaying a visual alert, and/or playing an audible alert, that the new observation is reliable). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 345 may classify (e.g., cluster) the new observation in a cluster, as shown by reference number 360. The observations within a cluster may have a threshold degree of similarity. As an example, if the machine learning system classifies the new observation in a first cluster (e.g., a cluster of unreliability), then the machine learning system may provide a first recommendation, such as an indication of unreliability. Additionally, or alternatively, the machine learning system may perform a first automated action and/or may cause a first automated action to be performed (e.g., by instructing another device to perform the automated action) based on classifying the new observation in the first cluster, such as displaying a visual alert (and/or playing an audible alert) that the new observation is unreliable. As another example, if the machine learning system were to classify the new observation in a second cluster (e.g., a cluster of reliability), then the machine learning system may provide a second (e.g., different) recommendation (e.g., an indication of reliability) and/or may perform or cause performance of a second (e.g., different) automated action, such as displaying a visual alert (and/or playing an audible alert) that the new observation is reliable.

In this way, the machine learning system may apply a rigorous and automated process to estimating reliability (e.g., of a product, a store, an email, or a webpage). The machine learning system may enable recognition and/or identification of tens, hundreds, thousands, or millions of features and/or feature values for tens, hundreds, thousands, or millions of observations. Additionally, the machine learning system may train the model 345 using a set of guidelines associated with an entity, thereby increasing accuracy and consistency and reducing delay associated with training relative to requiring computing resources to be allocated for training using labeled examples. The increased accuracy and consistency also results in reduced computing resources that are consumed each time the machine learning system applies the model 345.

As indicated above, FIGS. 3A-3B are provided as an example. Other examples may differ from what is described in connection with FIGS. 3A-3B. For example, the machine learning model may be trained using a different process than what is described in connection with FIG. 3A. Additionally, or alternatively, the machine learning model may employ a different machine learning algorithm than what is described in connection with FIGS. 3A-3B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 4:
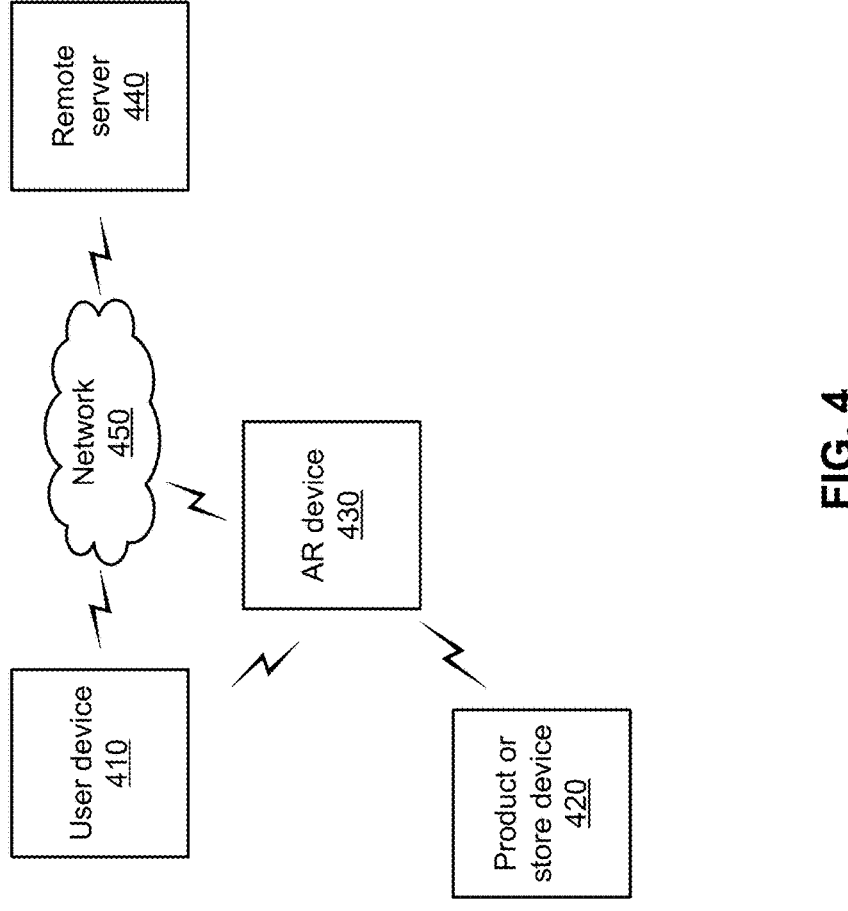
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a user device 410, a product or store device 420, an AR device 430, a remote server 440, and/or a network 450. Devices of environment 400 may interconnect via wired connections and/or wireless connections.

The user device 410 may include one or more devices capable of receiving, generating, storing, processing, and/or providing information associated with a product, a store, an email, and/or a website. For example, the user device 410 may include a communication device and/or a computing device. In some implementations, the user device 410 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 410 may include one or more input components and/or one or more output components to facilitate interaction with a user. Example input components of the user device 410 include a keyboard, a touchscreen, a mouse, and/or an optical sensor (e.g., a camera or another type of pixel array). Example output devices of user device 410 include a display and/or a speaker.

The product or store device 420 may include one or more devices capable of being integrated with a product or a store. In some implementations, the product or store device 420 may include a radio frequency identification (RFID) device (or another physical medium with integrated circuitry) capable of storing and communicating information associated with a product or a store. The product or store device 420 may store account information associated with a product or a store, which may be used in connection with a reliability model implemented by the AR device 430. In some implementations, the product or store device 420 may store the information in tamper-resistant memory of the product or store device 420, such as in a secure element. As part of communicating with the user device 410, the product or store device 420 may transmit the information to the AR device 430 using a communication component, such as a magnetic stripe, an integrated circuit (IC) chip (e.g., associated with one or more pins that physical contact the AR device 430), and/or a contactless communication component (e.g., an near field communication (NFC) component, a radio frequency (RF) component, a Bluetooth component, and/or a Bluetooth Low Energy (BLE) component). Thus, the product or store device 420 and the AR device 430 may communicate with one another by coming into contact with one another (e.g., using a magnetic stripe or an IC chip) or via contactless communication (e.g., using NFC).

The AR device 430 may include one or more devices capable of implementing a reliability model as described herein. Additionally, the AR device may include an output component capable of displaying an augmented user interface (UI), as described in connection with FIGS. 2A-2L. The AR device 430 may include a communication device and/or a computing device. For example, the AR device 430 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the AR device 430 may be capable of receiving, generating, storing, processing, and/or providing a credential associated with a user, as described elsewhere herein.

The remote server 440 may include one or more devices capable of processing, authorizing, and/or facilitating a model. For example, the remote server 440 may include one or more servers and/or computing hardware (e.g., in a cloud computing environment or separate from a cloud computing environment) configured to receive and/or store information associated with a reliability model as described herein. The remote server 440 may execute the model, such as to detect whether a product, a store, an email, or a website is reliable.

The remote server 440 may execute the model based on information received from the user device 410, such as images captured by the AR device 430, information communicated to the AR device 430 by the product or store device 420, and/or information stored by the remote server 440.

The network 450 may include one or more wired and/or wireless networks. For example, the network 450 may include a cellular network, a public land mobile network, a local area network, a wide area network, a metropolitan area network, a telephone network, a private network, the Internet, and/or a combination of these or other types of networks. The network 450 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
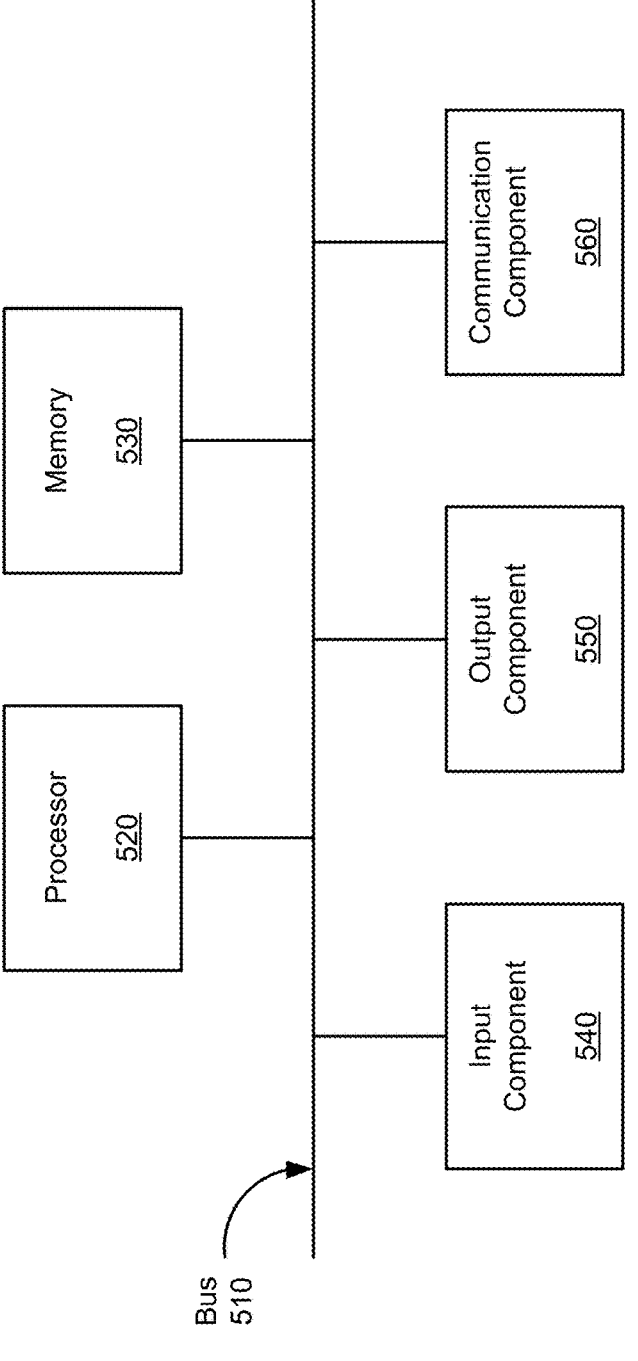
FIG. 5 is a diagram of example components of one or more devices of FIG. 4, in accordance with some embodiments of the present disclosure.

FIG. 5 is a diagram of example components of a device 500 associated with detecting reliability using AR. The device 500 may correspond to a user device, an AR device, a product or store device, and/or a remote server. In some implementations, the user device, the AR device, the product or store device, and/or the remote server may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500.

In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with detecting reliability using AR. In some implementations, one or more process blocks of FIG. 6 may be performed by the AR device 430. In some implementations, one or more process blocks of FIG. 6 may be performed by another device or a group of devices separate from or including the AR device 430, such as the user device 410, the product or store device 420, and/or the remote server 440. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving one or more first images representing a product, a store, an email, or a webpage associated with a first entity (block 610). For example, the AR device 430 (e.g., using processor 520, memory 530, input component 540, and/or communication component 560) may receive one or more first images representing a product, a store, an email, or a webpage associated with a first entity, as described above in connection with reference number 105 of FIG. 1A. As an example, an optical sensor may capture the first images as a distinct set of images (e.g., by capturing a preconfigured quantity of images in response to the command). Alternatively, the optical sensor may capture the first images relatively continuously (e.g., at 15 frames per second, 20 frames per second, or 40 frames per second, among other examples) and stream the first images to the AR device. Accordingly, the AR device may pass the first images through to an output component (e.g., a display) of the AR device (e.g., as shown in FIGS. 2A-2L).

As further shown in FIG. 6, process 600 may include detecting, within the one or more first images, at least one logo, at least one font, or at least one color (block 620). For example, the AR device 430 (e.g., using processor 520 and/or memory 530) may detect, within the one or more first images, at least one logo, at least one font, or at least one color, as described above in connection with reference number 125 of FIG. 1B. As an example, the AR device may apply filters; ANNs, such as CNNs; and/or video tracking or motion detection models, among other examples, to determine the at least one logo, the at least one font, the at least one color, and/or at least one additional factor as described above in connection with reference number 125 of FIG. 1B.

As further shown in FIG. 6, process 600 may include applying a model, trained on a set of guidelines associated with the first entity, to the at least one logo, the at least one font, or the at least one color (block 630). For example, the AR device 430 (e.g., using processor 520 and/or memory 530) may apply a model, trained on a set of guidelines associated with the first entity, to the at least one logo, the at least one font, or the at least one color, as described above in connection with reference number 130 of FIG. 1C. As an example, the AR device may apply the model to the at least one logo, the at least one font, the at least one color, and/or the at least one additional factor from image analysis described herein. Accordingly, the model may determine a reliability score (for the product, the store, the email, or the webpage) based on a similarity between the model to the at least one logo, the at least one font, the at least one color, and/or the at least one additional factor and what is expected based on the set of guidelines associated with the first entity.

As further shown in FIG. 6, process 600 may include receiving, from the model, a first score associated with the product, the store, the email, or the webpage (block 640). For example, the AR device 430 (e.g., using processor 520, memory 530, input component 540, and/or communication component 560) may receive, from the model, a first score associated with the product, the store, the email, or the webpage, as described above in connection with reference number 130 of FIG. 1C. As an example, when the first score satisfies a reliability threshold, the product, the store, the email, or the webpage may be most likely authorized by the first entity. On the other hand, when the first score fails to satisfy the reliability threshold, the product, the store, the email, or the webpage may be most likely authorized by a different entity (e.g., an infringing company or a known scam or fraud, among other examples).

As further shown in FIG. 6, process 600 may include transmitting an alert based on the first score failing to satisfy a reliability threshold (block 650). For example, the AR device 430 (e.g., using processor 520, memory 530, and/or communication component 560) may transmit an alert based on the first score failing to satisfy a reliability threshold, as described above in connection with reference number 135 of FIG. 1C. As an example, the alert may include the first score, an indication of whether the first score satisfies the reliability threshold (e.g., as shown in FIGS. 2C, 2F, 2I, and 2L), and/or a name of an entity most likely to be associated with the product, the store, the email, or the webpage.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1E, 2A-2L, and/or 3A-3B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for using augmented reality to detect reliability, the system comprising:
one or more memories; and
one or more processors, communicatively coupled to the one or more memories, configured to:
receive, at an augmented reality (AR) device, one or more first images representing a webpage or an email associated with a first entity;
detect, within the one or more first images, at least one logo;
apply a model, trained on a set of guidelines associated with the first entity, to the at least one logo as shown in the one or more first images;
receive, from the model, a first score associated with the webpage or the email;
receive, at the AR device, one or more second images further representing the webpage or the email;
detect, within the one or more second images, the at least one logo;
apply the model to the at least one logo as shown in the one or more second images;
receive, from the model, a second score associated with the webpage or the email; and
transmit, to the AR device, an alert based on the second score failing to satisfy a reliability threshold.

2. The system of claim 1,
wherein the model is further trained on a set of images of products associated with the first entity.

3. The system of claim 1,
wherein the one or more processors are further configured to:
receive, from the model, an indication that the webpage or the email is likely associated with a second entity.

4. The system of claim 1,
wherein the one or more processors are further configured to:
detect, within the one or more first images, at least one first color, wherein the first score is further based on the at least one first color; and
detect, within the one or more second images, at least one second color, wherein the second score is further based on the at least one second color.

5. The system of claim 1,
wherein the one or more processors are further configured to:

detect, within the one or more first images, at least one first font, wherein the first score is further based on the at least one first font; and
detect, within the one or more second images, at least one second font, wherein the second score is further based on the at least one second font.

6. The system of claim 1,
wherein the one or more processors are further configured to:
detect, within the one or more first images, a first placement and a first size associated with the at least one logo, wherein the first score is further based on the first placement and the first size.

7. A method of using augmented reality to detect reliability, comprising:
receiving, at an augmented reality (AR) device, one or more first images representing a webpage or an email associated with a first entity;
detecting, within the one or more first images, at least one logo;
detecting, within the one or more first images, at least one font;
detecting, within the one or more first images, at least one color;
applying a model, trained on a set of guidelines associated with the first entity, to the at least one logo, the at least one font, and the at least one color;
receiving, from the model, a first score associated with the webpage or the email;
receiving, at the AR device, one or more second images further representing the webpage or the email;
detecting, within the one or more second images, at least one of a new logo, a new font, or a new color;
applying the model to the new logo, the new font, or the new color;
receiving, from the model, a second score associated with the webpage or the email; and
transmitting, to the AR device, an alert based on the second score failing to satisfy a reliability threshold.

8. The method of claim 7, further comprising:
detecting, within the one or more first images, at least one spacing associated with the at least one logo,
wherein the model is applied to the spacing.

9. The method of claim 7, further comprising:
detecting, within the one or more first images, one or more white space measurements associated with text,
wherein the model is applied to the one or more white space measurements.

10. The method of claim 7, further comprising:
detecting, within the one or more first images, text; and
transcribing the text using optical character recognition,
wherein the model is applied to words within the text.

11. The method of claim 10, further comprising:
applying sentiment analysis to the text to determine a tone associated with the text,
wherein the model is applied to the tone.

12. The method of claim 7, further comprising:
detecting, within the one or more first images, a uniform resource locator (URL),
wherein the model is applied to the URL.

13. The method of claim 7, further comprising:
transmitting, to the AR device, an update based on the second score.

14. A non-transitory computer-readable medium storing a set of instructions for using augmented reality to detect reliability, the set of instructions comprising:

one or more instructions that, when executed by one or more processors of a device, cause the device to:

receive, at an augmented reality (AR) device, one or more first images representing a webpage or an email associated with a first entity;

detect, within the one or more first images, at least one logo;

detect, within the one or more first images, at least one font;

detect, within the one or more first images, at least one color;

apply a model, trained on a set of guidelines associated with the first entity, to the at least one logo, the at least one font, and the at least one color;

receive, from the model, a first score associated with the webpage or the email;

receive, at the AR device, one or more second images representing the webpage or the email;

detect, within the one or more second images, at least one of a new logo, a new font, or a new color;

apply the model to the new logo, the new font, or the new color;

receive, from the model, a second score associated with the webpage or the email; and transmit, to the AR device, an alert based on the second score failing to satisfy a reliability threshold.

15. The non-transitory computer-readable medium of claim 14, wherein the one or more instructions, when executed by the one or more processors, further cause the device to:

detect, within the one or more first images, one or more white space measurements associated with text, wherein the model is applied to the one or more white space measurements.

16. The non-transitory computer-readable medium of claim 14, wherein the one or more instructions, when executed by the one or more processors, further cause the device to:

detect, within the one or more first images, text; and transcribe the text using optical character recognition, wherein the model is applied to words within the text.

17. The non-transitory computer-readable medium of claim 16, wherein the one or more instructions, when executed by the one or more processors, further cause the device to:

apply sentiment analysis to the text to determine a tone associated with the text, wherein the model is applied to the tone.

18. The non-transitory computer-readable medium of claim 14, wherein the one or more instructions, when executed by the one or more processors, further cause the device to:

detect, within the one or more first images, an email address, wherein the model is applied to the email address.

19. The non-transitory computer-readable medium of claim 14, wherein the AR device comprises a smartphone or a pair of wearable glasses.

20. The non-transitory computer-readable medium of claim 14, wherein the one or more instructions, when executed by the one or more processors, further cause the device to:

transmit, to the AR device, an update based on the second score.

* * * * *